(12) United States Patent
Lampaert et al.

(10) Patent No.: US 12,443,022 B2
(45) Date of Patent: Oct. 14, 2025

(54) RESCAN OPTICAL SYSTEM, MICROSCOPE AND METHOD

(71) Applicant: CONFOCAL.NL B.V., Amsterdam (NL)

(72) Inventors: Stefan Georges Emile Lampaert, Vleuten (NL); Erik Martinus Marie Manders, Charlotteville (TT); Florian Frederik Sterl, Maarssen (NL)

(73) Assignee: CONFOCAL.NL B.V., Amsterdam (NL)

( * ) Notice: Subject to any disclaimer, the term of this patent is extended or adjusted under 35 U.S.C. 154(b) by 0 days.

(21) Appl. No.: 18/573,791

(22) PCT Filed: Jun. 20, 2022

(86) PCT No.: PCT/NL2022/050346
§ 371 (c)(1),
(2) Date: Dec. 22, 2023

(87) PCT Pub. No.: WO2022/271012
PCT Pub. Date: Dec. 29, 2022

(65) Prior Publication Data
US 2024/0295726 A1 Sep. 5, 2024

(30) Foreign Application Priority Data

Jun. 22, 2021 (NL) .................................. 2028507

(51) Int. Cl.
G02B 21/00 (2006.01)
(52) U.S. Cl.
CPC ..... *G02B 21/0048* (2013.01); *G02B 21/0032* (2013.01)
(58) Field of Classification Search
None
See application file for complete search history.

(56) References Cited

U.S. PATENT DOCUMENTS

| 4,241,257 A | * | 12/1980 | Koester | A61B 3/15 |
| | | | | 359/219.1 |
| 7,209,287 B2 | * | 4/2007 | Lauer | G02B 21/004 |
| | | | | 359/368 |

(Continued)

FOREIGN PATENT DOCUMENTS

| CA | 3035876 A1 * | 9/2020 |
| CN | 105849615 A | 8/2016 |

(Continued)

OTHER PUBLICATIONS

De Luca et al. "Re-scan Confocal Microscopy: Scanning Twice for Better Resolution", Biomedical Optics Express, Oct. 25, 2013, pp. 2644-2656, vol. 4, No. 11.

(Continued)

*Primary Examiner* — Derek S. Chapel
(74) *Attorney, Agent, or Firm* — Steven M. Koehler; Westman, Champlin & Koehler, P.A.

(57) ABSTRACT

A re-scan optical system comprises a scanning element; first optical elements directing light onto the scanning element to provide scanning illumination light; second optical elements directing the scanning illumination light towards a sample, and directing captured sample light onto the scanning element providing descanned sample light; third optical elements directing at least part of the descanned sample light back onto the scanning element to provide rescanning sample light; and fourth optical elements directing the rescanning sample light towards an imaging system. The third optical elements define a first beam segment of the descanned beam path and a second beam segment of the descanned beam path. The fourth optical elements define a third path segment from the scanning element between the first and second beam path segments and/or from the scanning element at an enclosed angle with the scanned sample light path in a range of 80-100 degrees.

18 Claims, 3 Drawing Sheets

(56) References Cited

U.S. PATENT DOCUMENTS

| | | | |
|---|---|---|---|
| 7,312,920 B2 | 12/2007 | Okugawa | |
| 2006/0066944 A1 | 3/2006 | Okugawa | |
| 2014/0146376 A1* | 5/2014 | Kleppe | G02B 21/0072 |
| | | | 359/385 |
| 2015/0286041 A1* | 10/2015 | Sheblee | G02B 21/367 |
| | | | 348/79 |
| 2019/0324240 A1* | 10/2019 | Shroff | G02B 21/0048 |
| 2022/0397751 A1 | 12/2022 | Manders | |
| 2023/0296870 A1* | 9/2023 | Manders | G02B 21/0048 |
| | | | 359/385 |

FOREIGN PATENT DOCUMENTS

| | | | | |
|---|---|---|---|---|
| CN | 111033350 A | | 4/2020 | |
| DE | 102005044842 A1 | | 3/2006 | |
| DE | 102013005927 A1 | * | 10/2014 | G02B 21/0036 |
| WO | 2013124107 A1 | | 8/2013 | |
| WO | 2018127566 A1 | | 7/2018 | |
| WO | 2020263094 A1 | | 12/2020 | |

OTHER PUBLICATIONS

De Luca et al. "Configurations of the Re-scan Confocal Microscope (RCM) for Biomedical Applications", Journal of Microscopy, May 1, 2017, pp. 166-177, vol. 266, No. 2.

Gregor, I. and Enderlein J. "Image Scanning Microscopy", Current Opinion in Chemical Biology, Jun. 13, 2019, pp. 74-83, vol. 51, Current Biology Ltd, London, GB.

Li et al. "Dual Mode Reflectance and Fluorescence Confocal Laser Scanning Microscopy for In Vivo Imaging Melanoma Progression in Murine Skin", Journal of Investigative Dermatology, Oct. 1, 2005, pp. 798-804, vol. 125, No. 4.

Paudel et al. "In-vivo Flow Cytometry for Blood Cell Analysis Using Differential Epi-detection of Forward Scattered Light", Progress in Biomedical Optics and Imaging, SPIE—International Society for Optical Engineering, Feb. 20, 2018, vol. 10497, 4 pages, Bellingham, WA, US.

Roth et al. "Optical Photon Reassignment Microscopy (OPRA)", Optical Nanoscopy, 2013, 6 pages, vol. 2, No. 5.

Steinbach et al. "Fluorescence-detected Linear Dichroism Imaging in a Re-scan Confocal Microscope Equipped with Differential Polarization Attachment", European Biophysics Journal, Apr. 13, 2019, pp. 457-463, vol. 48, No. 5.

Straub et al. "Versatile High-speed Confocal Microscopy Using a Single Laser Beam", Review of Scientific Instruments, Mar. 6, 2020, pp. 033706-1-033706-9, vol. 91.

International Search Report and Written Opinion in corresponding International Application No. PCT/NL2022/050346 dated Sep. 8, 2022.

International Preliminary Report on Patentability in corresponding International Application Serial No. PCT/NL2022/050346 dated Dec. 14, 2023.

Office Action in corresponding Chinese Application No. 202280044518.8 date Sep. 28, 2024.

* cited by examiner

RESCAN OPTICAL SYSTEM, MICROSCOPE AND METHOD

CROSS-REFERENCE TO RELATED APPLICATION(S)

This Application is a Section 371 National Stage Application of International Application No. PCT/NL2022/050346, filed Jun. 20, 2022 and published as WO 2022/271012 A1 on Dec. 29, 2022, in English, and further claims priority to Netherlands application Ser. No. 2028507, filed Jun. 22, 2021, the contents of which are hereby incorporated by reference in their entirety.

TECHNICAL FIELD

The present disclosure relates to re-scan optical systems and methods.

BACKGROUND

A re-scan confocal microscope is known from De Luca G M, Breedijk R M, Brandt R A, et al. "Re-scan confocal microscopy: scanning twice for better resolution". Biomed Opt Express. 2013; 4 (11): 2644-2656. Published 2013 Oct. 25. doi: 10.1364/BOE. 4.002644, hereinafter referred to as "De Luca". This microscope has two units: 1) a standard confocal microscope with a set of scanning mirrors which have double function: scanning the excitation light and de-scanning the sample light, and 2) a re-scanning unit that "writes" the light that passes a pinhole onto a camera. By controlling the ratio of the angular amplitude of the respective scanning mirrors and re-scanning mirrors, the properties of the microscope can be controlled.

In such a re-scan system it is important that the scanning and re-scanning mirrors perform synchronized movements. Preferably, each sweep of the scanning mirror exactly begins, respectively ends, at the same time as a corresponding sweep of the re-scanning mirror begins, respectively ends. If the scanning and re-scanning mirror move asynchronously, the obtained image will have a low quality. As will be understood, at higher scan speeds, the mirrors move faster and the acceptable margin of absolute error for the synchronization becomes smaller. Since the degree of synchronization of the mirrors in the system of De Luca is limited, the scan speed is also limited.

Similar systems are further described in B. Straub Benedikt et al, "Versatile high-speed confocal microscopy using a single laser beam", Rev. Sci. Instrum. 91, 033706 (2020); doi 10.1063/1.5122311, which uses two scanning elements per direction ($f_x$, $f_y$); G. Steinbach et al, "Fluorescence-detected linear dichroism imaging in a re-scan confocal microscope equipped with differential polarization attachment", European Biophysics Journal (2019) 48:457-463; doi 10.1007/s00249-01 9-01 365-4, which uses the system of De Luca (2013) mentioned above; and in G. M. R. De Luca, et al, "Configurations of the Re-scan Confocal Microscope (RCM) for biomedical applications", J. Microscopy 266 (2) 2017. pp, 166-177 doi: 10.1111/jmi.12526; and WO 2018/127566A1.

In order to overcome such synchronization problems, a single scanning mirror may be used both for scanning the excitation light, more generally referred to as illumination light, and for re-scanning the fluorescent light, more generally referred to as sample light. For example, Roth et al.: "Optical photon reassignment microscopy (OPRA)". Optical Nanoscopy 2013 2:5, hereinafter referred to as "Roth", discloses an optical photon reassignment microscope. In this microscope, a laser emits 488 nm excitation light that is directed to a dichromatic beam splitter, which reflects the excitation light onto a scanning unit. The scanning unit scans the excitation light onto an objective, which focuses the excitation light onto a sample. The returning fluorescent light is then directed back to the scanning unit and de-scanned. Subsequently, the fluorescent light is separated from the excitation light using the dichromatic beam splitter. After this separation, the fluorescent beam passes through an adjustable detection pinhole which can be used to achieve confocal sectioning. The pinhole is positioned between two lenses which expand the fluorescent beam. After expansion, the fluorescent beam is re-scanned using the same scanning system and projected via a lens to a camera.

A disadvantage of the latter microscope set-up is that, because the same scanning system is used for both scanning and re-scanning, the optical set-up is quite large: the de-scanned fluorescent light beam is guided all the way around the scanning system and then directed onto the scanning system which re-scans the fluorescent light beam onto the camera.

WO 2020/263094 discloses a re-scan microscope which relies on a rotatable element comprising at least two non-parallel reflective surfaces.

In view of the above, there is a need in the art for more compact optical re-scanning systems.

SUMMARY

In view of the above, herewith is provided a re-scan optical system as set out in the following.

In an aspect, the re-scan optical system comprises a scanning element and first optical elements defining an incident illumination beam path to the scanning element for directing a beam of illumination light onto the scanning element to provide a scanning illumination light beam from the scanning element;
  second optical elements defining a scanning beam path for directing the scanning illumination light beam from the scanning element towards a sample and illuminating the sample thus causing sample light, and for directing a beam of captured sample light ("scanned sample light beam") onto the scanning element to provide a descanned sample light beam from the scanning element;
  third optical elements defining a descanned beam path for directing at least part of the descanned sample light beam from the scanning element and back onto the scanning element to provide a rescanning sample light beam from the scanning element; and
  fourth optical elements defining a rescanning beam path for directing the rescanning sample light beam towards an imaging plane of an imaging system.

In the system, the third optical elements define a first beam path segment of the descanned beam path extending from the scanning element and a second beam path segment of the descanned beam path extending to the scanning element.

Further, the fourth optical elements define a third path segment extending from the scanning element between the first and second beam path segments and/or extending from the scanning element at an enclosed angle with the scanned sample light path in a range of 80-100 degrees.

Thus, the re-scan optical system may be constructed compact. The descanned beam path may define at least part of a size of the system. Also, the system may be constructed with relatively few optical elements which may be of simple construction (mirrors, lenses, filters etc.). Therefore the system is versatile.

The re-scan optical system may be combined with an imaging system defining and/or comprising the imaging plane, and/or with a microscope holding the sample. The microscope may comprise an objective, and the scanning beam path and the scanned sample light beam path may pass through the objective. The provided re-scan optical system, simplifies providing such combination in a small footprint and/or in an arrangement wherein the re-scan optical system is selectively used or not. This may in particular apply in case the fourth optical elements defining the third path segment extending from the scanning element at an enclosed angle with the scanned sample light path in a range of 80-100 degrees, e.g. substantially 90 degrees.

Optionally, the first and second path segments each are defined by a reflector and are devoid of beam directing optical elements for the sample light between the reflector and the scanning element. The reflector may be a beam splitter for selectively reflecting a light beam and or part thereof, e.g. a dichroic mirror and/or a polarization dependent reflector.

The one or more optical elements may be or comprise one or more of lenses, mirrors, beam splitters, filters, light pipes, optical fibers, prisms, apertures, electro- and/or acousto-optic modulators, polarizers and/or any suitable combination thereof.

The scanning element may be a reflector, in particular a mirror, preferably a dielectric mirror, defining a reflection side. In such case, the descanned beam path and preferably the scanned sample light path and/or the rescanning beam path may be arranged on the reflection side, allowing a small footprint of the system. The reflection side may be a half space defined by a reflective surface of the scanning element, e.g. a mirror surface.

The provided re-scan optical system may comprise a spatial filter in the descanned beam path (DSc) to improve image quality.

The third optical elements may comprise an aperture and a lens or lens system on either side thereof each defining a focus in the descanned beam path. The thus formed foci may overlap forming a common focus and the aperture may be arranged in the common focus.

This facilitates spatial filtering of the sample light and/or it may simplify confocal microscopy.

Preferably, the scanning element and at least one of the lens or lens system, more preferably each of the lens and/or lens systems are separated along the descanned beam path a focal length of the respective lens or lens system. In a sense, the aperture and the scanning element may then be considered to be on opposite sides of the lens or lens system, as it were.

This may obviate further lenses or lens systems in the descanned beam path and/or increase simplicity and/or robustness of alignment of the third optical elements, and possibly of the system as a whole and/or the system in combination with further systems.

The lenses and/or lens system(s) in the descanned beam path may have the same focal length. This may simplify one or more of design, manufacturing, and alignment of the system. Also or alternatively, it may reduce costs of manufacturing since fewer different elements need be provided.

In the system, the first optical elements may comprise a lens or lens system in the incident illumination light beam having a (first) focal length and the scanning element being arranged along the illumination light path a (first) focal length away from the lens or lens system.

Also or alternatively, the second optical elements may comprise a lens or lens system in the scanning beam path having a (second) focal length and the scanning element being arranged along the scanning beam path a (second) focal length away from the lens or lens system.

Also or alternatively, the fourth optical elements may comprise a lens or lens system in the rescanning beam path having a (fourth) focal length and the scanning element being arranged along the rescanning beam path a (fourth) focal length away from the lens or lens system.

Any one of these options, and in particular a combination thereof, may improve robustness of the optical system, inter alia with respect to alignment. Also, and in particular, this may assist providing one or more of the incident illumination beam path, the scanning beam path, and the rescanning beam path as telecentric beam paths, simplifying combining the re-scan optical system with further optical systems. At least two, preferably each of the first, second and fourth focal lengths may be equal.

Herewith, in an aspect also a re-scan optical system is provided which comprises, optionally in combination with any other embodiment discussed herein, a scanning element and first optical elements defining an incident illumination beam path to the scanning element for directing a beam of illumination light onto the scanning element to provide a scanning illumination light beam from the scanning element; second optical elements defining a scanning beam path for directing the scanning illumination light beam from the scanning element towards a sample and illuminating the sample thus causing sample light, and defining a scanned sample light path for directing a beam of captured sample light ("scanned sample light beam") onto the scanning element to provide a descanned sample light beam from the scanning element; third optical elements defining a descanned beam path for directing at least part of the descanned sample light beam from the scanning element and back onto the scanning element to provide a rescanning sample light beam from the scanning element; and fourth optical elements defining a rescanning beam path for directing the rescanning sample light beam towards an imaging plane of an imaging system. This re-scan optical system further is telecentric with respect to at least one of the scanning beam path and the rescanning beam path. Preferably the system is bi-telecentric with respect to both the scanning beam path and the rescanning beam path. This may simplify combination of the re-scan optical system with further optical systems, in particular in view of optical alignment of the various systems. Such further optical systems may in particular comprise a microscope or microscope objective in or connected with the scanning beam path and/or an imaging system in or connected with the rescanning beam path.

The system may be configured to provide a line-shaped intensity profile of the illumination light for illuminating the sample and causing the sample light. Thus, part of the sample may be illuminated simultaneously. The re-scan optical system may be configured such that the line shaped intensity profile has a major direction of extension perpendicular to a scanning direction of the illumination light at the sample for illuminating the sample and causing sample light along the line shape. The major direction of extension may be parallel to an axis of rotation of the scanning element. Thus, by scanning the illumination light the sample may be scanned by a line scan.

The first optical elements may comprise one or more optical elements for defining a line shaped intensity profile of incident light along the incident illumination beam path and/or for providing light along the scanning illumination light beam with a line shaped intensity profile.

The incident illumination light beam path may comprise one or more illumination spot defining elements defining the line-shaped intensity profile. In particular, the first optical elements may comprise the one or more illumination spot defining elements. The one or more illumination spot defining elements may comprise a lens and/or a beam mask; then, the lens may e.g. be or comprise a Powell lens, and/or a cylindrical lens. Also or alternatively, the one or more excitation spot defining elements may comprise one or more diffractive optical elements like a diffraction grating. The first optical elements may comprise a lens or lens system in the incident illumination light beam having a (first) focal length. Then, the beam mask, if provided, may be arranged along the illumination light path the (first) focal length away from and in front of the lens or lens system. Also or alternatively, the scanning element may be arranged along the illumination light path a (first) focal length away from and behind the lens or lens system. Note that words like "in front of" and "behind" refer to the direction of propagation of the light under consideration and/or the direction of propagation of light associated with the optical element (s) under consideration.

In the system, the scanned sample light beam path, in particular the scanning illumination beam path and/or the scanned sample light beam path, and the third beam path segment may define an enclosed angle in a range of 80-100 degrees preferably in a range of 85-95 degrees more preferably about 90 degrees. This may simplify inclusion of the system in a microscopy setup. E.g. the system may be readily inserted in a straight-angle beam line between a detection objective and an imaging system. Further, this may simplify arranging cables and/or other peripheral parts and portions.

Note that herein, an "enclosed angle" between two path segments relates to the smallest angle between the respective path segments with respect to a vertex of the path segments.

In the system, the incident illumination beam path and the scanning beam path may define an enclosed angle smaller than 130 degrees, e.g. in a range of 100-125 degrees preferably in a range of 105-120 degrees more preferably in a range of 110-115 degrees.

The sample light beam path and the first beam path segment may define an enclosed angle smaller than 130 degrees, e.g. in a range of 100-125 degrees, preferably in a range of 105-120 degrees more preferably in a range of 110-115 degrees.

The first beam path segment and the second beam path segment may define an enclosed angle smaller than 110 degrees, e.g. being acute and/or in a range of 80-100 degrees, preferably in a range of 85-95 degrees more preferably about 90 degrees.

The second beam path segment and the third beam path segment may define an enclosed angle which is 90 degrees or acute; preferably being in a range of 90-50 degrees preferably in a range of 80-60 degrees more preferably in a range of 75-65 degrees.

The scanning element may comprise a reflector defining a normal, preferably a mirror, more preferably a dielectric mirror, wherein each of the incident illumination beam path, the scanning beam path, the scanned sample light beam, the descanned beam path and the rescanning beam path are incident on and/or are reflected off the reflector in a respective angle to the normal, wherein the respective angle is smaller than 65 degrees to the normal, preferably smaller than 60 degrees, more preferably 55 degrees or less, and wherein the respective angle is larger than 25 degrees to the normal, preferably larger than 30 degrees such as 35 degrees or larger.

For a reflector, in particular a mirror such as a dielectric mirror, an angle of incidence of close to normal or close to 45 degrees to the normal of the reflective surface or -layer may be preferred over other angles of incidence. It is therefore preferred that the various beam paths incident on and reflected by the scanning element (and/or any other reflector in the system) are arranged at or close to such angles.

Arrangement of optical elements and alignment of the various beams may therefore be arranged such that enclosed angles between any of the previously discussed beams incident on and reflected by the scanning element and the normal defined by the scanning element are less than 65 degrees, preferably less than 60 degrees, more preferably 55 degrees or less, and possibly also larger than 25 degrees, preferably larger than 30 degrees such as 35 degrees; thus, the beams are arranged within angular spread of 20 degrees about an angle of 45 degrees to the normal, preferably within angular spread of 15 degrees, more preferably within angular spread of 10 degrees.

It is noted that the smaller the angle of incidence on a mirror may be to the normal, the smaller the surface area of the beam on the mirror is, so that a smaller mirror may suffice to reflect most or all of the beam; reducing size of a mirror may allow for a reduction of inertia of it which may enable a higher scanning velocity.

The optical system may be combined with a microscope and/or may itself comprise an objective for focusing at least part of the illumination light beam onto and/or into a sample. The objective may be an immersion objective for immersion focusing the at least part of the illumination light beam onto and/or into a sample. The optical system may also comprise a sample holder for holding the sample, preferably for holding the sample at or near a focus of the objective. Integrating the objective in the system may allow improvement of one or more of alignment, robustness, controllability, and image quality.

The optical system may be combined with an imaging system defining the image plane and/or may itself comprise an imaging system, which may define the image plane and which may comprise a camera. In any case, the optical system may be configured to focus at least part of the rescanned sample light onto the respective image plane.

BRIEF DESCRIPTION OF THE DRAWINGS

The above-described aspects will hereafter be more explained with further details and benefits with reference to the drawings showing a number of embodiments by way of example.

DETAILED DESCRIPTION OF EMBODIMENTS

Figure 1:
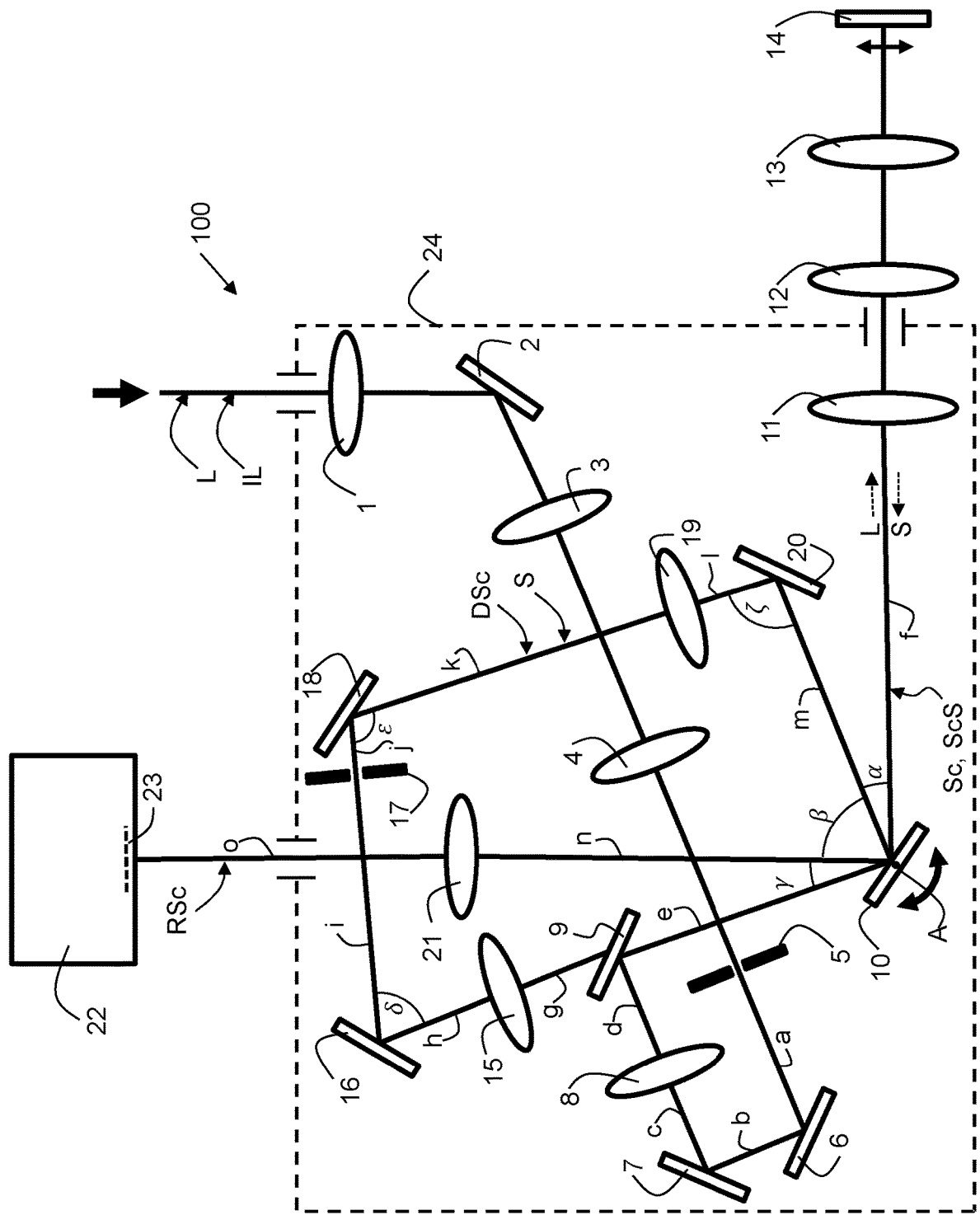
FIG. 1 indicates a first embodiment of a re-scan optical system.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same symbol, where helpful raised by hundreds and/or individualised with an accent and/or with alphabetic suffixes.

Further, unless otherwise specified, terms like "detachable" and "removably connected" are intended to mean that respective parts may be disconnected essentially without damage or destruction of either part, e.g. excluding structures in which the parts are integral (e.g. welded or moulded as one piece), but including structures in which parts are attached by or as mated connectors, fasteners, releasable self-fastening features, etc. The verb "to facilitate" is intended to mean "to make easier and/or less complicated", rather than "to enable".

FIG. 1 schematically shows a re-scan optical system 100 comprising optical elements 1-13 including scanning element 10, sample 14, optical elements 15-21, and a camera 22 defining an image plane 23. Most of the optical elements (here, elements 1-11, 15-21) are enclosed in an optional light- and dust-tight enclosure 24. The scanning element 10 is rotary, here about an axis of rotation A perpendicular to the plane of the Fig., the "scanning axis A" (see curved double arrow); however, the scanning element 10 may be rotary about another axis or about two perpendicular axes for scanning/descanning/rescanning in other directions.

In the system 100 illumination light from a light source (not shown, but generally comprising a laser light source) provided at the bold arrow follows an illumination light path L via the optical elements 1-13 to the sample 14 in the order of the reference numerals 1-14. The illumination light path L comprises an incident illumination beam path IL and a scanning beam path Sc. Some segments of the illumination light path L between successive ones of the optical elements 1-13 are indicated alphabetically a-f. The illumination light may be configured to excite fluorescence and/or one or more other luminous processes in the sample, other than reflecting and/or scattering illumination light.

A first portion of the incident illumination beam path IL of the illumination light path L is defined by collimator lens 1, beam steering mirror 2, illumination spot defining lens 3 such as a Powell lens, focusing lens 4, and illumination spot defining beam mask 5. Any of these elements are optional and may serve for directing incident light (in particular mirror 2) and/or for defining a line-shaped illumination spot intensity pattern (lenses 1-4 and beam mask 5). A Powell lens (lens 3) tends to provide a more homogenous intensity pattern along the direction of major extension of the line-shape than a cylinder lens for a Gaussian incident intensity profile, however providing relatively higher intensity at the ends of the line shape. To improve an even illumination intensity across the intensity profile, the ends may be skimmed by the beam mask 5 onto which the intensity pattern of the illumination spot defining lens 3 may be focused. However, also a cylinder lens and/or more and/or other optical elements, e.g. diffractive elements, may be used to define a suitable illumination spot intensity pattern. Note that other illumination spot intensity patterns may also be defined and used, such as a point-like (e.g. a Gaussian focus) or a Bessel beam focus, and/or more complex illumination light intensity patterns. The illumination light may be polychromatic but monochromatic being preferred.

From the beam mask 5, the incident illumination beam path IL of the illumination light path L continues via first optical elements 6-9 along segments a-e to the reflective scanning element 10. In the shown embodiment, the first optical elements 6-9 comprise, in succession: optional beam steering mirrors 6 and 7, lens 8 and beam splitter 9. Beam splitter 9 may be one or more of a partial reflector, a polarisation dependent beam splitter, a wavelength-dependent beam splitter, and/or a wavelength-dependent reflector such as a polychroic mirror, in particular a dichroic mirror, which latter option may be preferred.

At the scanning element 10 the illumination light is reflected over a reflection angle $\gamma+\beta+\alpha$ as indicated, and the illumination light path L continues via second optical elements 11, 12, defining a scanning beam path, and via objective 13 to the sample 14. In the shown embodiment, the second optical elements 11 and 12 are lenses. By rotating the scanning element 10 about the scanning axis A, the reflection angle $\gamma+\beta+\alpha$ of the illumination light beam off the scanning element 10 is varied and the illumination light beam is scanned over the sample 14 (see straight double arrow), illuminating the sample 14 in successive positions for causing sample light at those successive positions. The sample light may comprise one or more of reflected illumination light and light generated by and/or in the sample via any optical process, like fluorescence, phosphorescence, bioluminescence, multi-photon up-conversion and/or down-conversion, et cetera. Thus, a beam of illumination light is directed onto the scanning element 10 to provide, by reflection off the scanning element 10, a scanning illumination light beam from the scanning element 10 which is directed from the scanning element 10 towards the sample 14 for illuminating the sample 14 and causing sample light.

Preferably, the light path L extends substantially in a plane preferably perpendicular to the scanning axis A, to facilitate alignment. Also, or alternatively, a line-shaped intensity profile of the illumination spot intensity pattern preferably is aligned parallel to the scanning axis A at the scanning element 10.

In the system 100 sample light from the sample 14 follows a sample light path S via the optical elements 13-9 and 15-21 to the camera 22 in the indicated order of reference numerals 13-9, 15-21.

The sample light path S comprises a scanned sample light path ScS which here substantially coincides or overlaps with the scanning beam path Sc, a descanned beam path DSc and a rescanning beam path RSc. Some segments of the sample light path S are indicated as (in order) f, e, g-o.

In particular, at least part of the sample light is captured by the objective 13, thus forming a scanned sample light beam, and directed via the second optical elements 12, 11 and segment f onto the scanning element 10.

At the scanning element 10 the sample light is reflected over a reflection angle $\alpha+\beta+\gamma$ as indicated. By rotating the scanning element 10 about the scanning axis A, the reflection angle $\alpha+\beta+\gamma$ of the sample light off the scanning element 10 is varied and the scanned sample light beam from (the successive portions of) the sample 14 is descanned and a descanned sample light beam is provided from the scanning element 10. From the scanning element 10 the sample light path S continues via third optical elements 9, 15-20, along segments e, g-m, back onto the scanning element 10. Optical element 9 is a beam splitter which allows the sample light to pass, while it may block and/or reflect any illumination light reflected from the sample. In particular, the sample light may have another wavelength and/or polarization direction than the illumination light and the beam splitter 9 may be a dichroic mirror or filter and/or a polarisation beam splitter.

In the shown embodiment, the third optical elements 15-20, comprise, in succession: lens 15, beam steering mirror 16, aperture 17, beam steering mirror 18, lens 19, and beam steering mirror 20. Thus, a descanned beam path DSc is defined for directing at least part of the descanned sample light beam from the scanning element 10 and back onto the scanning element 10 to provide a rescanning sample light beam from the scanning element 10. The lenses 15 and 19 each define a focus in the descanned beam path DSc, which foci overlap forming a common focus and the aperture 17 is arranged in the common focus. This may serve for spatial filtering and/or a confocal sectioning. The aperture 17 may be a pinhole or a slit associated with the shape of the illumination spot (here, a slit in view of the line-shaped illumination intensity profile).

At the scanning element 10 the sample light is reflected over a reflection angle β as indicated and the sample light path S continues via fourth optical element 21, along segments n-o, towards the camera 22 along a rescanning beam path RSc. By rotating the scanning element 10 about the scanning axis A, the reflection angle β of the descanned sample light off the scanning element 10 is varied and the rescanning sample light beam from the scanning element 10 is scanned over the imaging plane 23 of the camera 22. Thus, a rescanning beam path RSc is defined for directing the rescanning sample light beam towards the imaging plane 23 of camera 22 of the imaging system.

Thus, the incident illumination beam path IL and descanned beam path DSc are static paths, whereas the scanning beam path Sc, scanned sample light path ScS and rescanning beam path RSc are dynamic paths.

As is clear from FIG. 1, (the segment n of) the rescanning beam path extends from the scanning element 10 between the segments e and m of the descanned beam path. The rescanning beam path (segment o) crosses or intersects the descanned beam path (at segment i). In particular, as shown, the rescanning beam path RSc crosses or intersects the descanned beam path DSc without intervening reflector in the rescanning beam path RSc between the scanning element 10 and (a camera 22 of) the imaging system. Preferably, one or more of the following options apply: the beam segments and their respective enclosed (reflection) angles α, β and γ are arranged so that one or more of: reflection angle β defined and enclosed by segments m and n is acute; angle α enclosed between segments f and m and angle γ enclosed between segments e and n are about equal; angle α+B enclosed between segments f and n and angle γ+β enclosed between segments e and m are about equal; angle α+B enclosed between segments f and n is about constant under rotation of the scanning element 10 about the scanning axis A; and angle α+β enclosed between segments f and n is about 90 degrees. In particular, the angles may be arranged such that angles α and γ each are about 15-30 degrees, e.g. 20-25 degrees and angle ß is about 55-75 degrees, e.g. 65-70 degrees.

Thus, by angle α+β being in a range 80-100 degrees preferably 85-95 degrees more preferably in about 90 degrees, the scanning beam path Sc and/or the scanning scanned sample light path ScS, i.e. the light paths towards and/or from the sample 14, and the rescanning beam path RSc towards the imaging system are about perpendicular, at least at the scanning element.

The reflection angles δ, ε, ζ at the beam steering mirrors 16, 18, 20 may be about perpendicular (the angle of incidence to and the angle of emission from the respective mirror being about 45 degrees to the normal of the respective mirror). However, in the shown embodiment these angles deviate somewhat to permit a smaller arrangement without the various optical elements 4, 5, 9, 15, 17, 19, 21 interfering with the various light beams; the lenses and mirrors may adhere to a common optics size, e.g. having a diameter of 0.5 inch (12.7 mm), 20 mm, 25 mm, 1 inch (25.4 mm), 30 mm, 1.5 inch (38.1 mm), or even 50 mm or 2 inch (50.8 mm), and be fit in optics mounts which should not or minimally intercept and/or obstruct beam path segments to prevent loss of signal.

In the embodiment shown, the lengths of the segments along the respective beam paths are, as an option, arranged such that:
  lens 4 projects an effective focus at mask 5;
  a+b+c=d+e=focal length lens 8;
  f=focal length lens 11;
  e+g=h+i=focal length lens 15, wherein g may include an effective optical length of beam splitter 9;
  j+k=l+m=focal length lens 19;
  n=focal length lens 21=o (optionally).

Thus, if lenses 8, 11, 15, 19 and 21 are equal, the lengths of the segments may be arranged as α+b+c=d+e=f=e+g=h+i=j+k=l+m=n=o (optionally), and a system is provided that is bi-telecentric system is provided and that does not provide intermediate magnification of the image.

Figure 2:
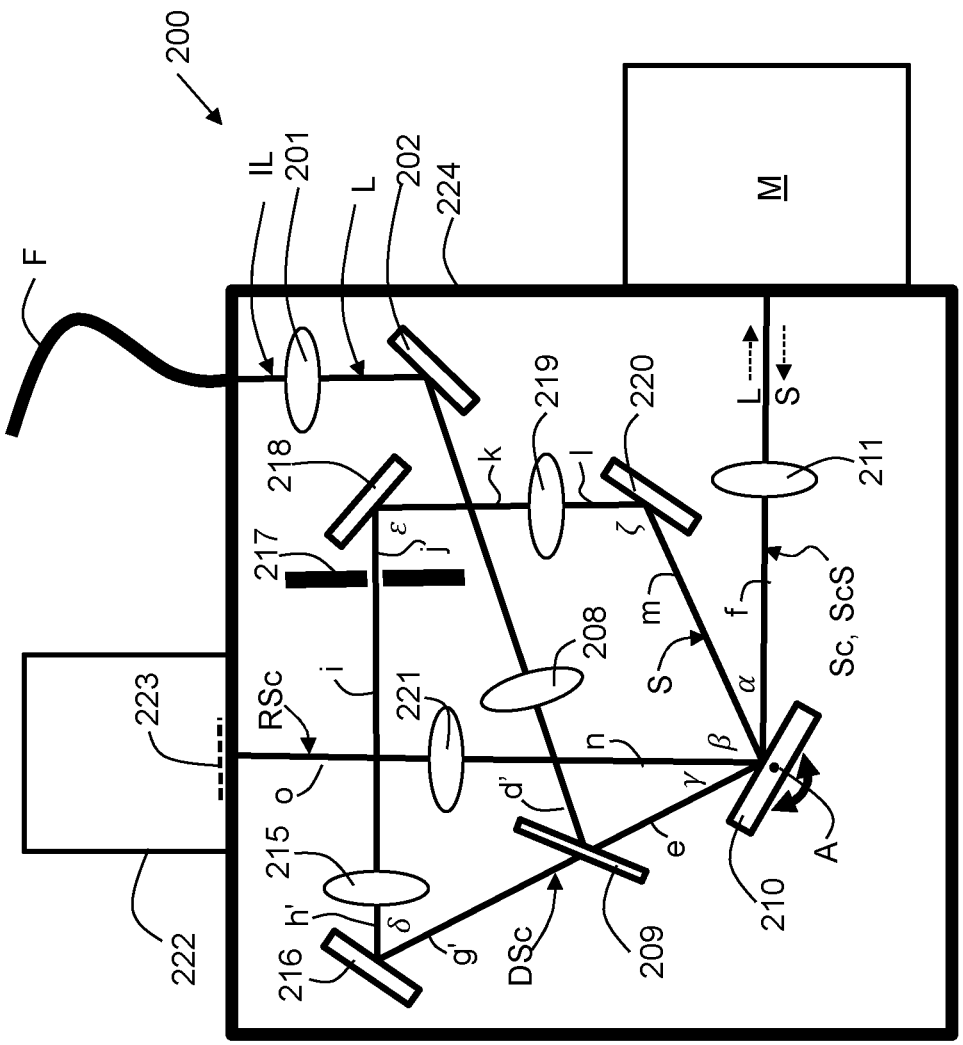
FIG. 2 indicates a second embodiment of a re-scan optical system.

FIG. 2 shows another embodiment of a re-scan optical system 200. Compared to FIG. 1, e.g., the incident illumination beam path L is simplified yielding differently divided beam path segments g' and h' and between the beam segments the angles δ, ε, ζ differ. A microscope objective and a sample are not shown but indicated as microscope M. In the system 200, the illumination light is optionally provided via an optical fibre F and an intensity profile of for illuminating the sample and causing the sample light may be defined by an exit lens and/or facet of the fibre F.

In this embodiment, lengths of the segments along the respective beam paths are, as an option, arranged such that:
  d'+e=focal length lens 208;
  f=focal length lens 211;
  e+g'+h'=i=focal length lens 215, wherein g' may include an effective optical length of beam splitter 209;
  j+k=l+m=focal length lens 219;
  n=focal length lens 221=o (optionally).

Figure 3:
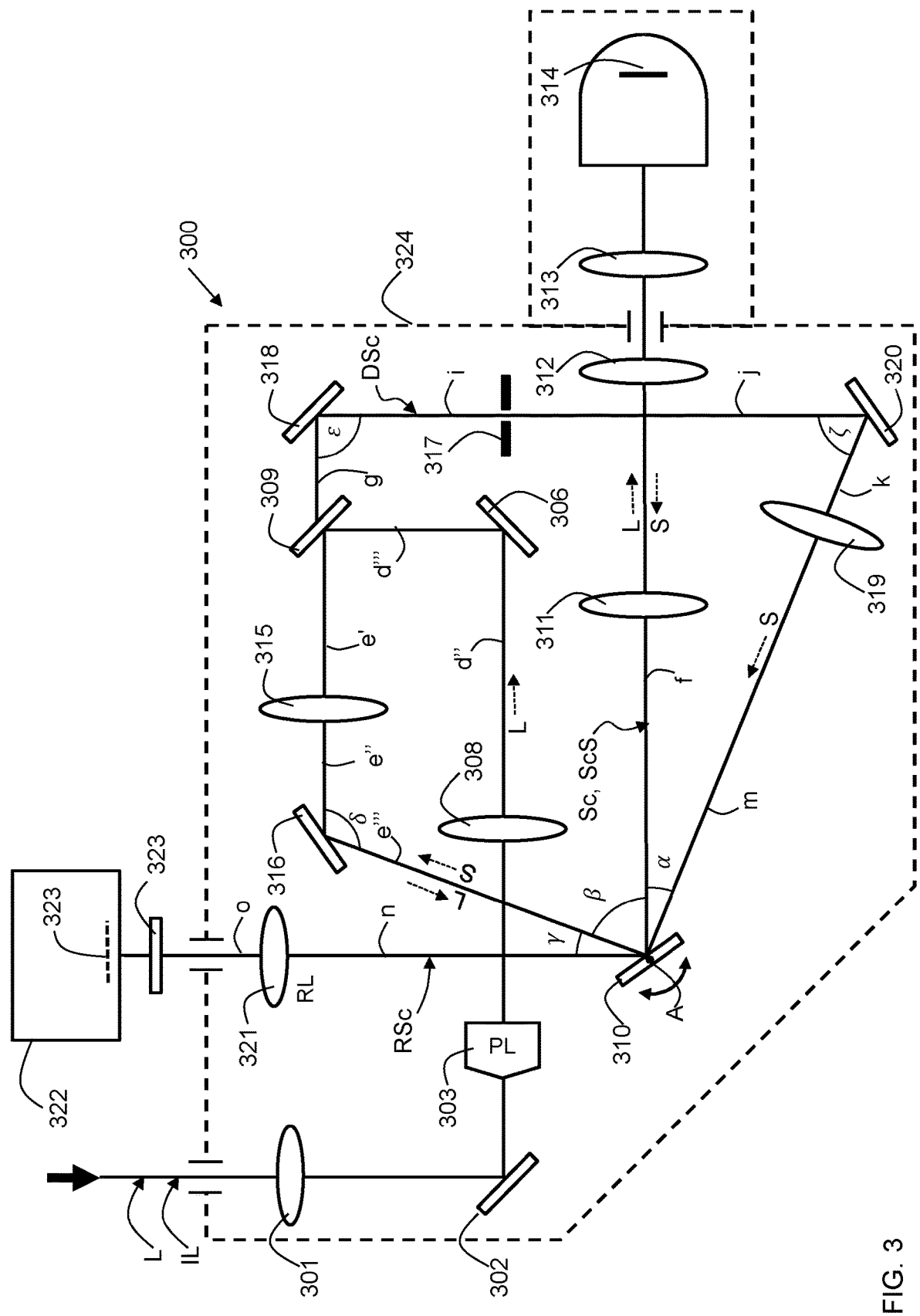
FIG. 3 indicates a third embodiment of a re-scan optical system.

Thus, if lenses 208, 215, 219 and 221 have equal focal lengths, the lengths of the segments may be arranged as d'+e=f=e+g'+h'=i=j+k=l+m=n=o (optionally), providing a bi-telecentric system with constant magnification. FIG. 3 shows another embodiment of a re-scan optical system 300. The incident illumination beam path L extends through first optical elements, here comprising collimator lens 301, beam steering mirror 302, illumination spot defining lens 303, along segment d", d"', via beam steering mirror 306, to beam splitter 309, and from there along segments e'-e"' via optical elements lens 315 and mirror 316 to the reflective scanning element 310. At the scanning element 310 the illumination light is reflected over a reflection angle γ+β+α as indicated, and the illumination light path L continues along segment f via second optical elements, here comprising lenses 311, 312, defining a scanning beam path Sc and via objective 313 to the sample 314 (possibly in a sample holder and/or with further optical elements in between).

Light from the sample 314 follows a sample light path S, along the scanned sample light path ScS via second optical elements 313-311 to the scanning element 310 (comprising segment f). From the scanning element 310 the sample light further follows the sample light path S along the descanned beam path DSc via third optical elements, here comprising beam steering mirror 316, lens 315, beam splitter 309 which is transmissible for the sample light, beam steering mirror 318, aperture 317, beam steering mirror 320, lens 319, back to the scanning element 310 (comprising, in order, segments e''', e'', e', g, i, j, k, and m). The optional lenses 315 and 319 and aperture 317, arranged in a focus of the lenses 315, 319, may serve for spatial filtering. Then the sample light further follows, from the scanning element 310, the sample light path S along the rescanned light path RSc via fourth optical elements, here comprising lens 321 (comprising, in order, segments n and o) to towards an imaging plane (23; 223; 323) of an imaging system, e.g. comprising a camera 322 and here an optional optical filter 324.

Compared to FIGS. 1 and 2, (the segment f of) the scanning beam path Sc and the scanned sample light path ScS extends from and to the scanning element 10 between the segments e''' and m of the descanned beam path, rather than (a segment n of) the rescanned beam path RSc. Now, the scanning beam path Sc and the scanned sample light path ScS cross or intersect the descanned beam path (e.g. at segment i or j, the latter case being shown). However, again as in FIGS. 1 and 2, the scanned sample light path (ScS) and the rescanning beam path (RSc) extend substantially perpendicular to each other at the scanning element 10, defining an enclosed angle $\chi+\Psi$. The angle $\chi+\Psi$ may be in a range of 80-100 degrees, preferably being in a range of 85-95 degrees, more preferably about 90 degrees, as shown.

The second beam path segment m and the third beam path segment n define an enclosed angle $\varphi+\chi+\Psi$ which is obtuse. The first and second beam path segments e''', m define an enclosed angle $\varphi+\chi$ smaller than 110 degrees, e.g. in a range of 80-100 degrees, preferably in a range of 85-95 degrees, more preferably about 90 degrees.

Preferably, the lenses 308 and 315, 319 and 321 have equal focal lengths and are suitably arranged with respect to each other along the beam paths, in particular separated by once or twice the focal lengths (d''+d'''+e'=e''+e'''=f=e'+g+i=j+k=m=n=focal length), so that the system of FIG. 3 is bi-telecentric.

The disclosure is not restricted to the above described embodiments which can be varied in a number of ways within the scope of the claims.

For instance the system may comprise more and/or differently arranged lenses and/or lens systems. Also or alternatively, the static beam path may comprise more or fewer reflectors and/or be provided with one or more prisms.

Elements and aspects discussed for or in relation with a particular embodiment may be suitably combined with elements and aspects of other embodiments, unless explicitly stated otherwise.

The invention claimed is:

1. A re-scan optical system comprising:
a rotary scanning element;
one or more first optical elements defining an incident illumination beam path (IL) to the scanning element for directing a beam of illumination light onto the scanning element to provide by rotating the scanning element a scanning illumination light beam from the scanning element, wherein the one or more first optical elements comprises a Powell lens configured to form a line-shaped intensity profile of the illumination light for illuminating the sample, wherein the line-shaped intensity profile has a main direction of elongation in a direction perpendicular to a direction of scanning;
one or more second optical elements defining a scanning beam path (Sc) for directing the scanning illumination light beam from the scanning element towards a sample and illuminating the sample thus causing sample light, and
defining a scanned sample light path (ScS) for directing a beam of captured sample light onto the scanning element to provide by rotating the scanning element a descanned sample light beam from the scanning element;
one or more third optical elements defining a descanned beam path (DSc) for directing at least part of the descanned sample light beam from the scanning element and back onto the scanning element to provide by rotating the scanning element a rescanning sample light beam from the scanning element;
one or more fourth optical elements defining a rescanning beam path (RSc) for directing the rescanning sample light beam towards an imaging plane of an imaging system;
wherein the one or more third optical elements define a first beam path segment (e; e; e'''') of the descanned beam path (DSc) extending from the scanning element and a second beam path segment (m; m; m) of the descanned beam path (DSc) extending to the scanning element, and
the one or more fourth optical elements define as a part of the rescanning beam path (RSc) a third path segment (n; n; n)
extending from the scanning element between the first and second beam path segments (e, m; e, m) and/or
extending from the scanning element at an enclosed angle with the scanning beam path (Sc) and/or the scanned sample light path (ScS, f; ScS, f; ScS, f) in a range of 80-100 degrees; or
the one or more second optical elements define as a part of the scanning beam path (Sc) and/or the scanned sample light path (ScS) a path segment (f) extending from and/or to the scanning element between the first and second beam path segments (e''', m); and/or
wherein a) the scanning beam path (Sc) and/or the scanned sample light path (ScS) and b) the rescanning beam path (RSc) define an enclosed angle ($\alpha+\beta$; $\chi+\psi$) at the scanning element in a range of 80-100 degrees.

2. The re-scan optical system according to claim 1, comprising a spatial filter in the descanned beam path (DSc).

3. The re-scan optical system according to claim 1, wherein the one or more third optical elements comprise an aperture and a lens or lens system on either side thereof each defining a focus in the descanned beam path (DSc), wherein the foci overlap forming a common focus and the aperture is arranged in the common focus.

4. The re-scan optical system according to claim 3, wherein the lenses and/or lens system(s) in the descanned beam path (DSc) have the same focal length.

5. The re-scan optical system according to claim 3, wherein the scanning element and each said lens or lens system are separated along the descanned beam path (DSc) a focal length of the respective lens or lens system.

6. The re-scan optical system according to claim 1, wherein the one or more first optical elements comprise a lens or lens system in the illumination light path (IL) having a focal length and the scanning element is arranged along the illumination light path a focal length away from the lens or lens system.

7. The re-scan optical system according to claim 1, wherein the re-scan optical system is telecentric, with respect to at least one of the scanning beam path and the rescanning beam path.

8. The re-scan optical system according to claim 7, wherein the re-scan optical system is bi-telecentric with respect to both the scanning beam path and the rescanning beam path.

9. The re-scan optical system according to claim 1, wherein the one or more first optical elements comprises a beam mask configured to skim opposing ends of the line-shaped intensity profile of the illumination light.

10. The re-scan optical system according to claim 1, wherein the scanned sample light beam path (f) and the third beam path segment (n) define an enclosed angle ($\alpha+\beta$) smaller than 110 degrees.

11. The re-scan optical system according to claim 1, wherein the first beam path segment (e; e; e″) and the second beam path segment (m; m; m) define an enclosed angle ($\beta+\gamma$; $\varphi+\chi$) smaller than 110 degrees.

12. The re-scan optical system according to claim 1, wherein the second beam path segment (m) and the third beam path segment (n) define an enclosed angle ($\beta$) which is 90 degrees or acute.

13. The re-scan optical system according to claim 1, wherein the scanning element comprises a reflector defining a normal, wherein each of the incident illumination beam path (IL), the scanning beam path (Sc), the scanned sample light path (ScS), the descanned beam path (DSc) and the rescanning beam path (RSc) are incident on and/or are reflected off the reflector in a respective angle to the normal, wherein the respective angle is smaller than 65 degrees to the normal, and wherein the respective angle is larger than 25 degrees to the normal.

14. The re-scan optical system according to claim 13, wherein the scanning element comprises at least one of a single sided mirror defining a normal and a dielectric single sided mirror defining a normal.

15. The re-scan optical system according to claim 1, wherein the optical system comprises an objective for focusing at least part of the illumination light beam onto and/or into a sample.

16. The re-scan optical system according to claim 1, wherein the optical system comprises an imaging system defining the image plane and the optical system is configured to focus at least part of the rescanned sample light onto the image plane.

17. The re-scan optical system according to claim 1, wherein the one or more second optical elements comprise a lens or lens system in the scanning beam path having a focal length and the scanning element is arranged along the scanning beam path a focal length away from the lens or lens system.

18. The re-scan optical system according to claim 1, wherein the one or more fourth optical elements comprise a lens or lens system in the rescanning beam path having a focal length and the scanning element is arranged along the rescanning beam path a focal length away from the lens or lens system.

* * * * *